C. Jillson,

Jaw Trap,

No. 2,590. Reissued May 7, 1867.

Witnessees
Thos. H. Dodge
D. L. Miller.

Inventor
C. Jillson.

AM. PHOTO-LITHO. CO. N.Y. (OSBORNE'S PROCESS)

United States Patent Office.

CLARK JILLSON, OF WORCESTER, MASSACHUSETTS.

*Letters Patent No.* 22,078, *dated November* 16, 1858; *reissue No.* 2,590, *dated May* 7, 1867.

IMPROVEMENT IN ANIMAL TRAPS.

The Schedule referred to in these Letters Patent and making part of the same.

KNOW ALL MEN BY THESE PRESENTS:

That I, CLARK JILLSON, of the city and county of Worcester, and Commonwealth of Massachusetts, have invented certain new and useful improvements in Animal Traps; and I do hereby declare that the following is a full, clear, and exact description of the construction and operation of the same, reference being had to the accompanying drawings, making a part of this specification, in which—

Similar letters in the separate figures denote like parts in both of them.

Letters Patent of the United States were granted to me on the sixth day of January, 1857, for an animal trap that was to be placed around the animal's hole so that the trap became, as it were, a part of or a prolongation of the hole. But in this trap the forks or spears were forced in the hole. The nature of my present invention consists in so making the trap as that the hole shall close up or collapse, and thus bring up the fork or spear; also in a device for adjusting the set of the trap, as will be shown and described hereafter.

To enable those skilled in the art to which my invention belongs to make and use the same, I will proceed to describe it.

Figure 2:
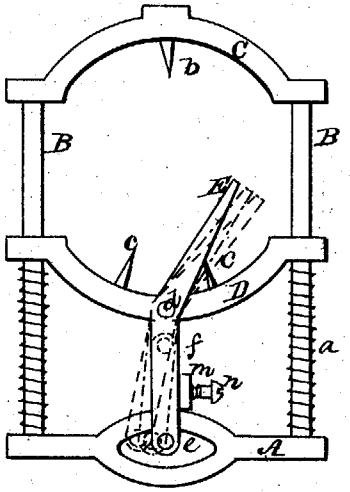
Figure 2 represents the trap as set around, over, or against the animal's hole.
Figure 1:
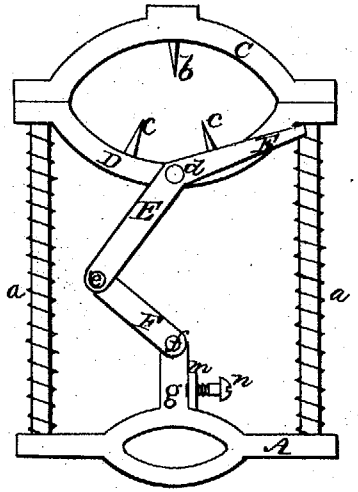
Figure 1 represents a view of the trap as sprung or closed.

A represents the rear of the trap, to which the several parts are connected. In this piece A may be an opening for fastening the trap, either by a chain, strap, string, or otherwise. Two rods B B connect the piece A with the bow or yoke C, this much of the trap being rigid. D is a cross-head, sliding on the two rods B B, and forced by the two coiled springs *a a* towards the bow or yoke C. The cross-head D is curved in the reverse of the curve C, so that when the two, C and D, are sprung together, the opening or hole between them shall be of an elliptical form. There may be one or more spears or points *b* on the bow, as also one or more points *c* on the movable part or cross-head D. E is a trigger, pivoted to D at the point *d;* it is also pivoted at *e* to a link, F, which link is in turn pivoted at *f* to the arm *g*, which is fast to or a part of the rear piece A. The trigger E and link F form the toggle-joint, and when the movable piece D is brought down against the springs *a a* until the pivoted points *d e f* are in line, it will stand so. The lip or projection *m* upon the arm *g*, or part to which the rear end of the rear arm of the toggle-joint is hinged, is provided with a set-screw, *n*, against which the arm or rear of the trigger E comes when the trap is set, as shown in dark lines, fig. 2. This set-screw is to regulate the amount of motion or power that will be required to let off or spring the trap so that it shall go more or less easy, as may be desired. When the trap is set, as shown in fig. 2, it will be seen that the opening between the two pieces C and D is much enlarged, and that the point of the trigger projects over or into the said open space so that the animal, in passing through between the bows C D, which make an extension, continuation, or prolongation of his hole, will move said trigger, and, tripping the toggle-joint, allow the springs *a a* to force up the movable piece D, and by thus contracting or closing the hole to force the points or spears into the animal and thus secure it. In traps in which a toggle-joint is employed, and in which the trap is set by moving said toggle-joint or lever so as to bring the pivots or hinges of the arms upon a line or nearly so with each other, it is important to have some convenient mode of adjusting the amount of motion or power required to spring or let off the trap, since, by use, the wearing or springing of the parts often renders more or less motion or power requisite to throw the joints of the arms of the toggle-lever sufficiently far out of line to allow the spring power to act and close the trap. By the use of the lip or projection *m*, cast with the arm or piece to which the rear arm of the toggle-joint is hinged, in combination with an adjusting screw *n*, the rear arm of the toggle-joint can be very easily and accurately adjusted so that a very slight pressure upon the end of the trigger will be sufficient to move the parts past the centres or joints so far as to allow the spring power to act and close the trap. In fig. 2 the mode of adjusting is shown and illustrated in red and blue lines. When the rear arm of the joints is allowed to rest against the end of the screw in the position in dark lines, fig. 2, it requires more motion of the trigger E, and consequently more power to spring the trap than when the screw is turned in to stop the trigger at the points, (shown in red and blue lines, same figure.) When the trigger is stopped in the position shown in blue lines it springs much easier than when stopped in either of the other positions. The functions of the lip or projection *m* and adjusting screw *n*, it will be seen, are therefore quite important in the class of animal traps above named, and are consequently quite as useful when applied to my said patented trap as the one shown in the drawings. The trap is light, small, cheap, and simple, and can be set, hung, or placed over or around a hole almost anywhere, or, if not immediately over or around the hole, a board, brick, or any other continuation of the hole may be made so as to cause the animal to pass through between the pieces or bows C D in going to or coming from their hiding-places.

I am aware that rat-traps have been made where the jaws have been sprung toward each other, and that a single jaw has been made to move in the arc of a circle; these I do not claim, but what I do claim as new, and desire to secure by Letters Patent, is—

1. A rat or animal trap, in which the jaws are moved in a plane and parallel with each other, and which, when tripped, shall close up or contract the said opening, substantially as herein described and represented, and for the purposes set forth.

2 Casting or forming the piece to which the rear end of the toggle-joint is hinged, in an animal trap in which a toggle-joint is used to set the trap, by bringing the joints up on a line, or nearly so, with a lip or projection *m*, for the purposes stated.

3. The combination of the adjusting screw *n* with the lip or projection *m* in an animal trap for the purposes 4. The combination, in an animal trap, of a hinged trigger, E, and hinged arm, F, with an adjusting screw to regulate the set of the trap for the purposes stated.

C. JILLSON.

Witnesses:

THOS. H. DODGE,

D. L. MILLER.